US010095800B1

(12) United States Patent
Yalamanchi

(10) Patent No.: US 10,095,800 B1
(45) Date of Patent: Oct. 9, 2018

(54) MULTI-TENANT DATA STORE MANAGEMENT

(71) Applicant: Amazon Technologies, Inc., Reno, NV (US)

(72) Inventor: Aravind Yalamanchi, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 1098 days.

(21) Appl. No.: 14/108,227

(22) Filed: Dec. 16, 2013

(51) Int. Cl.
*G06F 17/30* (2006.01)
*G06F 21/62* (2013.01)

(52) U.S. Cl.
CPC .. *G06F 17/30893* (2013.01); *G06F 17/30303* (2013.01); *G06F 17/30306* (2013.01); *G06F 21/6227* (2013.01)

(58) Field of Classification Search
CPC ......... G06F 17/30575; G06F 17/30292; G06F 17/30289; G06F 17/30893; G06F 17/30525; G06F 17/30592; G06F 17/30557–17/30607; G06F 17/30221–17/30306
USPC .................................................. 707/783, 784
See application file for complete search history.

(56) References Cited

U.S. PATENT DOCUMENTS

| 6,681,228 | B2 | 1/2004 | Balogh | |
|---|---|---|---|---|
| 7,047,258 | B2 | 5/2006 | Balogh | |
| 7,167,877 | B2 | 1/2007 | Balogh | |
| 7,203,682 | B2 | 4/2007 | Balogh | |
| 2002/0021665 | A1* | 2/2002 | Bhagavath | H04L 43/00 370/229 |
| 2003/0084038 | A1 | 5/2003 | Balogh et al. | |
| 2003/0154216 | A1* | 8/2003 | Arnold | G06F 17/30292 |
| 2010/0332646 | A1* | 12/2010 | Balasubramanian | G06F 9/5016 709/224 |
| 2012/0095974 | A1 | 4/2012 | Bentkofsky | |
| 2012/0096521 | A1* | 4/2012 | Peddada | G06F 21/629 726/4 |
| 2013/0205063 | A1* | 8/2013 | Zhang | G06F 11/1415 711/102 |

\* cited by examiner

*Primary Examiner* — James Trujillo
*Assistant Examiner* — Fariborz Khoshnoodi
(74) *Attorney, Agent, or Firm* — Kilpatrick Townsend & Stockton LLP

(57) ABSTRACT

Systems and methods for managing multi-tenant data stores are provided in which a storage abstraction layer may be used by various storage profiles to access one or more databases. Different storage profiles, including different physical storage parameters and/or different modes of data access, may be advantageously used for various entities/users having different storage, access, and other, requirements. Storage profiles for existing users may also be modified, and/or switched to different storage profiles, based on changes in the use of service provider resources, access to a provided web service, and/or required database size, etc.

24 Claims, 7 Drawing Sheets

MULTI-TENANT DATA STORE MANAGEMENT

BACKGROUND

Multi-tenant data stores are used in environments where multiple entities store and/or manage their data in a common repository. These may be used, for example, in cloud storage applications, e-commerce platforms (e.g., "virtual storefronts"), online service providers, resource management services, and other situations using multi-tenant data stores and any number of other resources.

It is common in platforms and applications supporting a large community of users for different users to have varying data management needs. For example, in a multi-seller e-commerce platform, a large number of sellers contribute their catalog data to a platform that may manage all of the data pertaining to their operations, such as orders, shipments, performance, and payments. The data management needs for a specific seller may vary based on the size of the catalog, the rate at which they receive orders, their history and growth on the platform, etc. For example, an established seller with a large catalog may need the ability to filter their data set using multiple dimensions, e.g., category of item and brand name. On the other hand, the search requirements for a new seller may be met with a more limited capability, e.g., limited to keyword searches or the like.

Different users may also have different requirements with respect to record maintenance, data access time, permissible costs, etc. For examples, one seller may choose to retain their order history for six years, while another seller may wish to keep it for perpetuity. Additionally, one customer may be willing to accept increased access time for a reduced cost, whereas another customer may be willing to pay more for shorter access time, etc.

Such environments also make scaling the multi-tenant data store more challenging as each user of such environment may be subject to varying rates of growth, which the platform may not be able to estimate accurately. Typically, each user of a multi-tenant data store is managed using a common scheme, and the data store is configured using a common architecture that is compatible with all of the users sharing the platform according to the common scheme. Systemic issues arising from operating such platforms at larger and larger scales will impact all the users of the platform.

BRIEF DESCRIPTION OF THE DRAWINGS

Various embodiments in accordance with the present disclosure will be described with reference to the drawings, in which.

DETAILED DESCRIPTION

Figure 1:
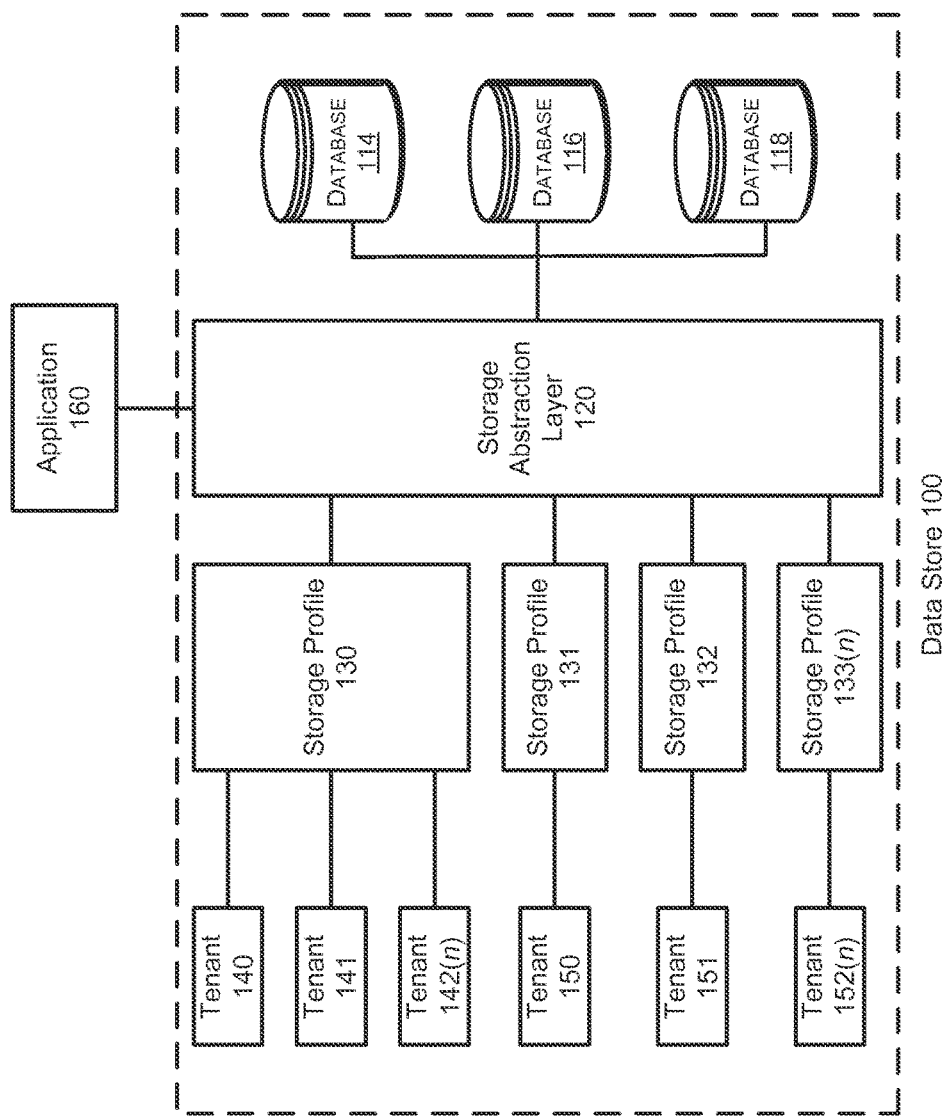
FIG. 1 illustrates a multi-tenant data store environment including a storage abstraction layer that interacts with a plurality of storage profiles and databases, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to certain aspects of the disclosure, storage resources for multiple web services, such as multiple catalogues for different web stores, may be managed on a common platform that includes multiple levels of accessibility. For example, a web service platform supporting multiple merchants may have a first level with dedicated databases for each merchant, a second level with shared databases that support multiple merchants, and a third level that stores merchant data in cold storage (e.g., including storage locations that are not easily or readily accessible). A storage abstraction layer may be used to manage the data access of the various merchants on the platform, and to reassign merchants to different levels depending on how the merchant is using the resources, e.g., "seasonal" merchant data may be moved to cold storage during off-season times when the data is not being changed or otherwise accessed very often, and the data may be moved from cold storage to a live database when traffic increases.

Systems and methods for managing multi-tenant data stores are provided in which a storage abstraction layer may be used by various storage profiles to access one or more databases. Different storage profiles, including different physical storage parameters and/or different modes of data access, may be advantageously used for various entities/users having different storage, access, and other, requirements. Storage profiles for existing users may also be modified, and/or switched to different storage profiles, based on changes in the use of service provider resources, access to a provided web service, and/or required database size, etc.

In some examples, a computer-implemented method may include one or more of providing a data store including a plurality of databases and/or providing web services for a plurality of tenants.

As used herein, web services should be broadly understood as applying to various public and/or private network (e.g., the Internet) services including, for example, distributed databases, cloud storage, e-commerce, publishing, or similar services supported by network and/or web-based storage. In some examples, a given web service may be associated with a particular webstore or virtual storefront for a particular merchant.

In some examples, a web service such as a website, a virtual storefront, a webstore, etc., may be provided as part of an electronic marketplace, and may be managed by one or more service provider computers (e.g., servers) that host electronic content in the form of, for example, an electronic catalog, with or without associated purchase and billing functionality, may be provided for various merchants or tenants. Customers may access the web service, e.g., a virtual storefront, to view, review, discuss, order, and/or purchase items (e.g., physical items or services) from the web service.

In some examples, a web service, such as a cloud storage service, may be provided to various entities/tenants including, educational, government, corporate or individual customers, and may be managed by one or more service provider computers (e.g., servers) that provide web portals, APIs and the like, through which the customers can upload, modify and/or retrieve data or executables to, or from, remote databases.

In some examples, each of the web services may access at least one of the databases of the data store. Some examples may include assigning, to each of the tenants, a storage profile including parameters for accessing at least one of the databases. In some examples, a storage abstraction layer may be provided that is configured to access some or all of the databases of the data store and to recognize and/or implement the parameters included in each of the storage profiles.

Some examples may include reassigning a tenant to a different storage profile than originally assigned based on the tenant's use of service provider resources, the tenant's access to a provided web service, users' access to a provided web service, and/or changes in required database size. As used herein, "reassigning" a storage profile should be broadly understood as including modifying an existing storage profile that is assigned to a tenant or other entity, modifying an existing storage profile to include access/permissions to a tenant or other entity, creating a new profile for a tenant or other entity, and other techniques that will be appreciated by those of skill in the art.

In some examples, reassigning the tenant to a different storage profile may include storing a copy of database content for a web service provided to the tenant using the different storage profile.

In some examples, reassigning a storage profile may include migrating data and/or resources for a tenant to cold storage based on, for example, an access rate, change rate, or other parameter falling below a first threshold. In some examples, reassigning a storage profile may include migrating data and/or resources for a tenant from cold storage to a dedicated, shared or other live database based on, for example, an access rate, change rate, or other parameter rising above a second threshold. In some examples, the first and second thresholds may be based on the same, or different, parameters. In some examples, the first and second thresholds may be substantially equal, the first threshold may be higher than the second threshold, or the first threshold may be lower than the second threshold.

In some examples, providing the web service for a given tenant may include the storage abstraction layer using the parameters included in the storage profile assigned to the given tenant to at least one of read, write or delete data stored in at least one of the databases supporting the web service for the given tenant.

In some examples, the storage profiles may include parameters for assigning the web service for a tenant to a dedicated database; assigning the web service for a tenant to a shared database; and/or assigning the web service for a tenant to cold storage.

In some examples, a storage profile assigned to a tenant may include parameters assigning the web service for that tenant to a dedicated database, whereas another of the storage profiles (assigned to a different tenant) may include parameters for assigning the web service for the other tenant to a shared database.

In some examples, a storage profile assigned to a tenant may include parameters assigning the web service for that tenant to a shared database, and at least one other of the storage profiles (assigned to another tenant) may include parameters for assigning the web service for the other tenant to cold storage.

In some examples, the shared database may include at least one physical database that is partitioned to different tenants. In some examples, the cold storage may include archived files that are not part of a live database.

In some examples, the web services may include a plurality of electronic storefronts provided for the tenants, or plurality of other services provided on an individualized basis to various users/customers.

According to further aspects, an exemplary system may include a memory that stores computer-executable instructions, and a processor configured to access the memory and execute the computer-executable instructions to collectively provide a data store including a plurality of databases, provide web services for a plurality of tenants, assign each of the tenants a storage profile including parameters for accessing at least one of the databases of the data store, and/or provide a storage abstraction layer that is configured to access all of the databases of the data store and to recognize and implement the parameters included in each of the storage profiles. In some examples, each of the web services may access at least one of the databases of the data store.

In some examples, providing the web service for a given tenant may include the storage abstraction layer using the parameters included in the storage profile assigned to the tenant to read, write and/or delete data stored one or more of the databases supporting the web service for the tenant.

In some examples, the storage profile assigned to each tenant may define physical storage parameters for a database accessed by the web service provided for the tenant and/or may define a mode of data access for the database accessed by the web service provided for the tenant.

In some examples, the physical storage parameters included in the storage profiles may include at least one of defining the database as a dedicated database, defining the database as a shared database, and/or assigning the web service to a cold storage.

In some examples, the storage abstraction layer may be configured to recognize different data access modes included in different storage profiles and to access different databases using the different data access modes.

In some examples, the storage profiles may include at least one profile that provides a dedicated database with a specified storage scheme for one tenant, and at least one profile that accesses a shared database with a specified storage scheme for multiple tenants.

In some examples, the processor and/or computer instructions may be further configured to assign a tenant to a storage profile based on a length of time that the tenant has been hosted by the service provider, a required database size for the web service provided for the tenant, a rate of change for a database being accessed by the web service provided for the tenant, a data retention requirement and/or order history associated with the web service provided for the tenant, and/or web service options requested by the tenant.

In some examples, the processor and/or computer instructions may be further configured to estimate a required database size for the web service provided for the tenant, a rate of change for a database being accessed by the web service provided for the tenant, and/or an order frequency associated with the web service provided for the tenant.

In some examples, the processor and/or computer instructions may be further configured to reassign a tenant to a different storage profile than originally assigned based on the tenant's use of service provider resources, the tenant's access to a provided web service, users' access to a provided web service, and/or changes in required database size.

In some examples, at least one of the storage profiles may be dedicated to a specific tenant and at least one other profile may be assigned to multiple tenants.

In some examples, the web service may include cloud storage, an electronic storefront, a financial service, human resources management, web-based publishing, etc.

According to yet further aspects, an exemplary system may include a memory that stores computer-executable instructions, and a processor configured to access the memory and execute the computer-executable instructions to collectively provide a data store including a plurality of databases, provide a web service with access to the plurality of databases, enroll a user with the web service, assign the user a storage profile including parameters for accessing at least one of the databases, provide a storage abstraction layer that is configured to access all of the plurality of databases and to implement the parameters included in the storage profile, and/or read, write and/or delete data stored in the at least one database via the storage abstraction layer using the parameters included in the storage profile.

In some examples, enrolling the user may include providing the user with a plurality of options related to database size, resource access, and/or physical storage parameters for a database.

In some examples, assigning the storage profile to the user may include creating the storage profile, or selecting the storage profile from a plurality of existing profiles, based on a user response to the plurality of options.

In some examples, computer-executable instructions may be provided for enrolling a plurality of users with the web service, at least two of the users being assigned different storage profiles including different physical storage parameters and modes of data access, and the storage abstraction layer configured to implement the different physical storage parameters and modes of data access included in the different storage profiles.

In some examples, the physical storage parameters included in the storage profiles may include at least one of defining the database as a dedicated database, defining the database as a shared database, and/or assigning the web service to a cold storage.

In some examples, storage profiles available to be assigned to the user include at least one profile that provides a dedicated database with a specified storage scheme for the user, and at least one profile that accesses a shared database with a specified storage scheme for multiple users.

According to yet further aspects, an exemplary computer-readable storage medium may include computer-executable instructions that, when executed by one or more computer systems, configure the one or more computer systems to perform operations including providing web services accessing a plurality of databases, with the web services provided for a plurality of entities, and assigning each of the web services for the entities to a plurality of tiers. In some examples, assigning a storage profile to each entity may be based on the assigned tier. In some examples, the storage profile may include parameters for accessing at least one of the databases.

Examples may also include providing a storage abstraction layer that is configured to access the plurality of databases and/or to implement the parameters included in each of the storage profiles.

In some examples, the plurality of tiers may include at least a first tier in which each entity is assigned a dedicated database to support the web service for the particular entity, a second tier in which two or more of the entities are assigned a shared database to support the web services for the two or more entities, and a third tier in which the web services are supported by a cold storage.

In some examples, at least one of the first, second or third tiers may include additional sub-tiers based on, for example, search functionality provided for one of the databases supporting a web service, a storage requirement of an entity, and/or a resource usage related to at least one of the web services provided to an entity.

In some examples, instructions for reassigning the web service for an entity from one of the tiers to a different tier, and/or changing the storage profile assigned to the entity may also be provided. The reassigning of the web service from one of the tiers to a different tier, and/or the changing of the storage profile assigned to the entity may be based on, for example, metrics associated with at least one of storage requirements of the entity, database operations, and/or resource usage related to the web service.

In some examples, reassigning the web service for the entity from one of the tiers to a different tier, and/or changing the storage profile assigned to the entity, may include storing a copy of database content for the web service provided to the entity using a different storage profile than originally assigned to the entity.

Additionally, in some aspects, a computer-readable storage medium may be provided including computer-executable instructions that, when executed by one or more computer systems, configure the one or more computer systems to perform operations described herein.

The techniques described above and below may be implemented in a number of ways and in a number of contexts. Several example implementations and contexts are provided with reference to the following figures, as described below in more detail. However, the following implementations and contexts are but a few of many.

Turning to FIG. 1, an example of a first data store 100, according to aspects of the disclosure, is provided. As shown in FIG. 1, in this example, managing user data in a multi-tenant data store 100 may employ a storage abstraction layer 120 that effectively separates the logical data model from the physical multi-tenant data architecture (included in databases 114, 116, 118, etc.). The storage abstraction layer 120 may be configured to perform various write, read and/or delete functions with respect to each of databases 114-1118, and may be configured to use parameters provided by various storage profiles 130-133$n$ to create and/or modify databases, such as 114-118, and other databases and web services discussed herein.

In the example shown in FIG. 1, the data store 100 may be configured to support web-based, or other networked, operations such as cloud storage, e-commerce, service support, etc., for tenants 140-142$n$ and 150-152$n$. Each of tenants 140-142$n$ and 150-152$n$ is assigned to a storage profile from among storage profiles 130-133$n$. It is noted that there may be any number of tenants, storage profiles or databases supported by the example shown in FIG. 1. Additionally, although shown as individual blocks for ease of description, in some examples, the data store 100 may be configured to allow a tenant to create and manage multiple users (e.g., multiple employees), under a single account and to set resource-based access policies.

In this instance, although all the users/tenants 140-142n and 150-152n of the data store 100 may have a common logical data model, the physical organization of data may be determined by the user's specific storage needs, and defined in the respective storage profile assigned to the tenant. As further shown in FIG. 1, certain tenants (e.g., 140-142n) may be assigned to "shared" profiles (e.g., 130) that allow the tenant to share a database resource with other tenants, there may also be tenants (e.g., 150-152n) that are assigned to "unique" storage profiles (e.g., 131-133n), that may enable access to a dedicated database, or other dedicated resource, to each of those tenants. Various implementations of such features are discussed further below.

Each of storage profiles 130-133n may include instructions or other data, associated with a specific physical storage strategy. For example, in a multi-seller e-commerce platform such as Amazon.com®, sellers with significant data needs may be assigned to a storage profile that enables them to provision a dedicated database with custom indexes that suit their needs. Such indexes may facilitate, for example, the users being able to filter the data set on one more dimensions, such as categories of products and their brand names.

On the other end of the spectrum, small sellers may all be stored in a simple multi-tenant database. One example of a multi-tenant database may include a file system in which a single file may be used to store all of seller's data in a structured format, such as XML.

The storage abstraction layer 120 may present a unified data model for all tenants 140-142n and 150-152n, as well as applications 160, such as the web services accessing the data. Applications 160 may be provided by the service provider that is providing the web service, by the tenant, by a third party, and combinations thereof. For example, in the case of a cloud storage application, the service provider may provide all of the code necessary for the web service, whereas in certain e-commerce and publishing applications, the tenant may use the data storage services in support of their own web store, etc., which may also include third party applications therein.

The storage abstraction layer 120 may be configured to access all of the databases 114-118 of the data store 100 and to recognize and/or implement the parameters included in each of the storage profiles.

In some examples, a fixed number of storage profiles may be created, each with a specific physical organization of data and ideal data characteristic. For example, a storage profile (e.g., 150) may be created to have a dedicated database with a specified schema and custom indexes for managing a tenant with volumes of data (with the ability to filter the data along multiple dimensions). Similarly, a storage profile (e.g., 130) may be created for managing the data in a shared schema data store.

In some examples, each tenant on a platform, such as data store 100 or a specific web service platform is assigned a specific profile, which determines the organization of data and mode of data access for that tenant. The differences between different modes of access are built into the storage abstraction layer, thereby presenting a consistent and uniform data model for all the services.

Various levels of distinguishable storage profiles, e.g., "tiers" representing varying configurations, or degrees, of features associated with database or other resource support, are also possible, and can be established in a pre-determined list, or created on an ad hoc basis considering factors such as storage size, storage duration, storage indexing, storage access, other resource dedication/usage, etc.

Figure 2:
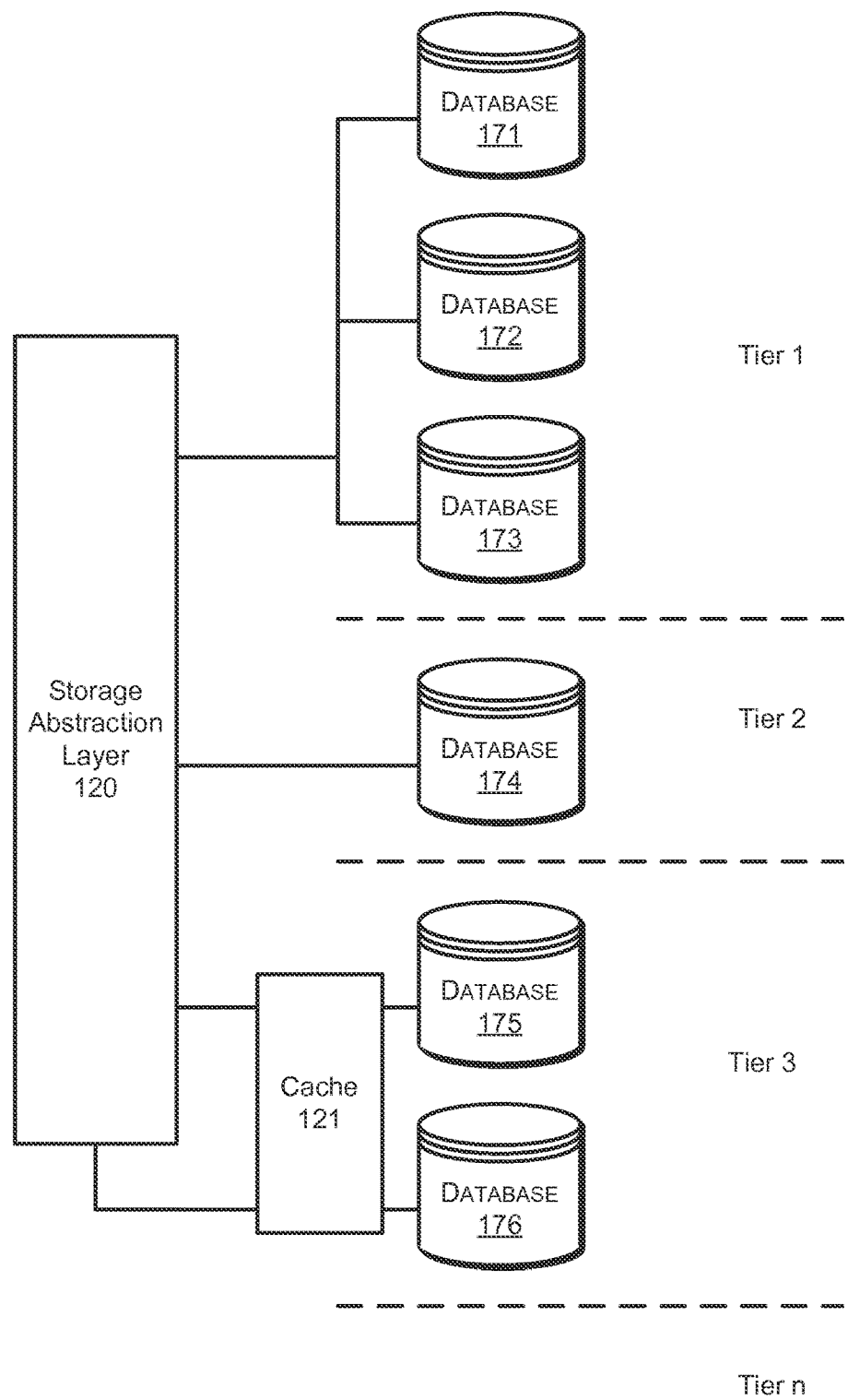
FIG. 2 illustrates additional details regarding the exemplary storage abstraction layer shown in FIG. 1, including connections to various tiers of databases.

FIG. 2 is a schematic showing possible communication connections between the storage abstraction layer and different tiers of databases. In this example, the databases are grouped into three tiers, which may include additional sub-tiers and/or additional tier(s) n. Tier 1 includes databases 171-173 that may be configured as dedicated databases for particular entities. In some examples, the databases in Tier 1 may share a similar communication protocol with the storage abstraction layer, or they may use two or more different protocols.

Information identifying and/or setting the appropriate protocol for the database communication may be set in the storage profile that links a tenant with a supporting database. Such protocols may include, for example, HTTP for certain databases, such as dedicated databases 171-173, or BitTorrent™, e.g., to lower costs for high-scale distribution.

Tier 2 includes one or more shared database(s) 174 that may be configured to support multiple entities. In some examples, the shared database 174 may include a physical storage device that is partitioned for the use of several entities. In some examples, multiple databases in Tier 2 may share a similar communication protocol, or they may use two or more different protocols.

Tier 3 includes databases, such as 175 and 176, that may be configured as cold storage. In the example shown in FIG. 2, databases 175 and 176 may redundantly store copies of the same data, e.g., in different physical storage devices and/or at different facilities. Typically, cold storage may involve storing collections of data and/or executables in a durable "cold" repository, that is not considered to be a "live" database, e.g., it is not amenable to writing, and/or deleting individual database entries.

In some examples, a cold storage may store data as archives. An archive can represent a single file or may combine several files as a single archive. In some example, retrieving archives from cold storage may involve initiation of a job that may require minutes, or an extended period of time, to complete (e.g., 5 minutes to 5 hours), versus the more immediate retrieval/modification options for a live database.

In some examples, cold storage databases, such as 175, 176, may be accessed by the storage abstraction layer 120 via a cache 121. Access requests from tenants and/or customers may be loaded into cache 121, for example, while the requested information is located, unpacked from relevant archives, and/or validated. In some examples, e.g., where the tenant's data is migrated to cold storage based on a relatively low access rate, the tenant's data may be read into the cache in response to the tenant's occasional access/login event. The use of such caches may be beneficial, for example, in allowing the cold storage to respond to multiple requests without waiting for the results of a particular request to be returned or otherwise impairing the performance of the cold storage.

In some examples, tenants may create, access, and manage the cold storage files using a management console or specific APIs provided by the service provider that provides the web service, or another third party that is responsible for managing and/or archiving data associated with the web service. An individual tenant may have multiple blocks of data (which may be referred to as "vaults"), in cold storage.

In some examples, the cold storage may be configured to support secure transfer of data over Secure Sockets Layer (SSL) and/or to automatically store data encrypted at rest, e.g., using Advanced Encryption Standard (AES) 256, a secure symmetric-key encryption standard using 256-bit encryption keys.

In some examples, cold storage may be used as an efficient solution, such as in situations where a seller or other tenant, and/or the tenant's customers, rarely accesses the data, and allows the service provider to lower the cost of managing the tenant's data. In some examples, the storage abstraction layer, or other monitoring service, may be configured to migrate data or other resources to cold storage based on one or more parameters falling below a first threshold, and/or to restore the data or other resources from cold storage to an active database based on the same or other parameters rising above a second threshold.

In some examples, the cold storage may include multiple facilities and/or storage devices that redundantly store the tenant's data. This may be beneficial, for example, in making data verification and repair easier, e.g., when storing, accessing and/or maintaining stored data. In some examples, the cold storage data may be synchronously stored across multiple facilities and/or storage device, and cross-validated, before registering a successful upload of the cold storage data.

As mentioned previously, various embodiments of the present subject matter are not limited to a finite number of tiers, and may include any number of sub-tiers within Tiers 1-3 shown in FIG. 2, or additional tiers represented by Tier n.

In some examples, the different databases, and/or tiers of databases such as shown in FIG. 2, may support different levels of data writing, reading and/or deleting, including different levels of searchability, different indexing, different response times, etc. For example, any of databases 171-173 that are dedicated to particular tenants may be searchable in multiple dimensions, which may be set/selected by the respective tenant. In e-commerce applications, and other services, a tenant may set various storage duration(s) for order records, receipts, data logs, etc. Such parameters may be defined in the storage profile assigned to the tenant, and implemented in the assigned database by the storage abstraction layer 120.

In some examples, tenants and/or web services classified in a certain tier may be mutually supported by a first subset of resources (such as a particular subset of servers), whereas web services classified in another tier may be supported collectively, or individually, by another, distinct, subset of resources (e.g., a second subset of servers that are isolated from the first subset of servers). For example, web services in a first tier may be isolated from one another, and/or from web services in the other tiers, and/or supported by their own exclusive servers and/or infrastructure, web services in a second tier may be supported by a subset of servers or infrastructure according to some commonality among the second tier web services, and/or web services in a third tier may be commonly supported and managed by the service provider on common servers and/or database infrastructure. However, myriad other configurations are also possible given the individual needs of various tenants, commonalities that can be leveraged, security concerns, etc.

Figure 3:
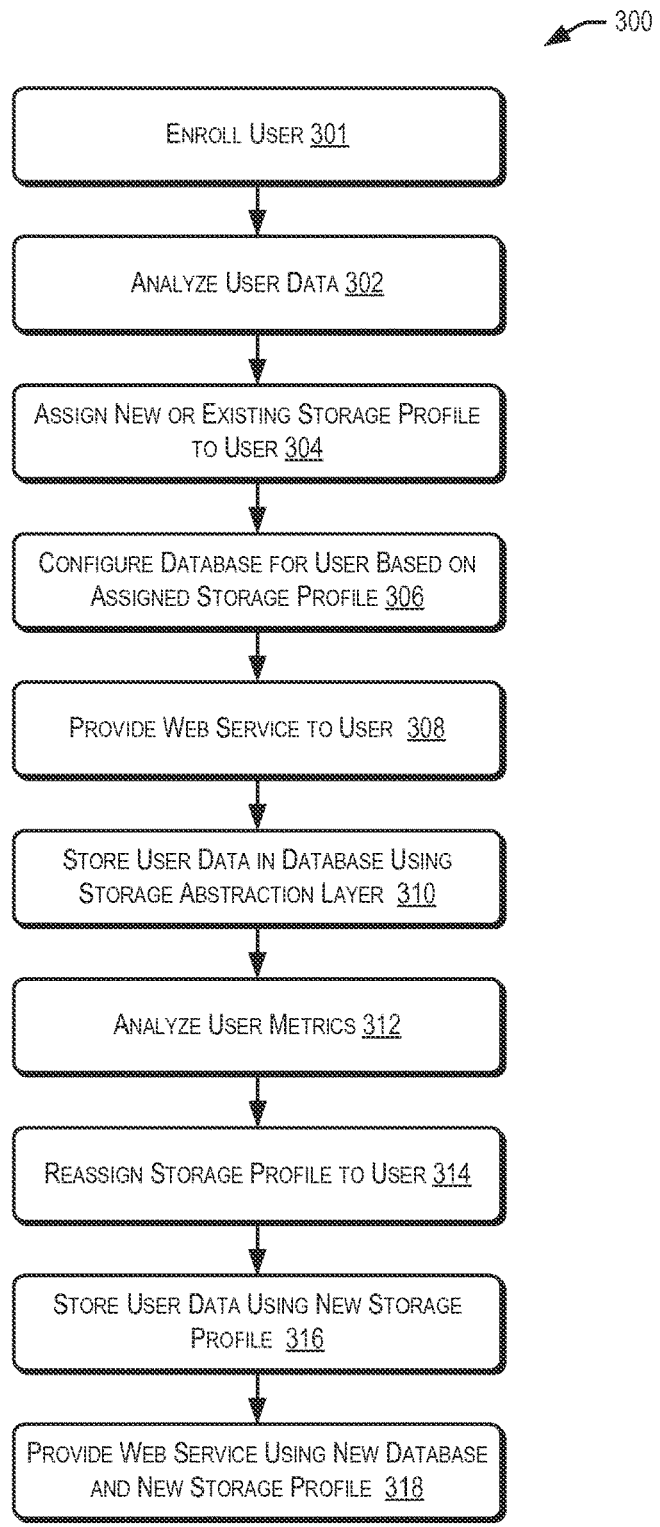
FIG. 3 is a flow diagram depicting an example flow including classifying a web service to a particular tier as described herein, according to at least one example.
Figure 4:
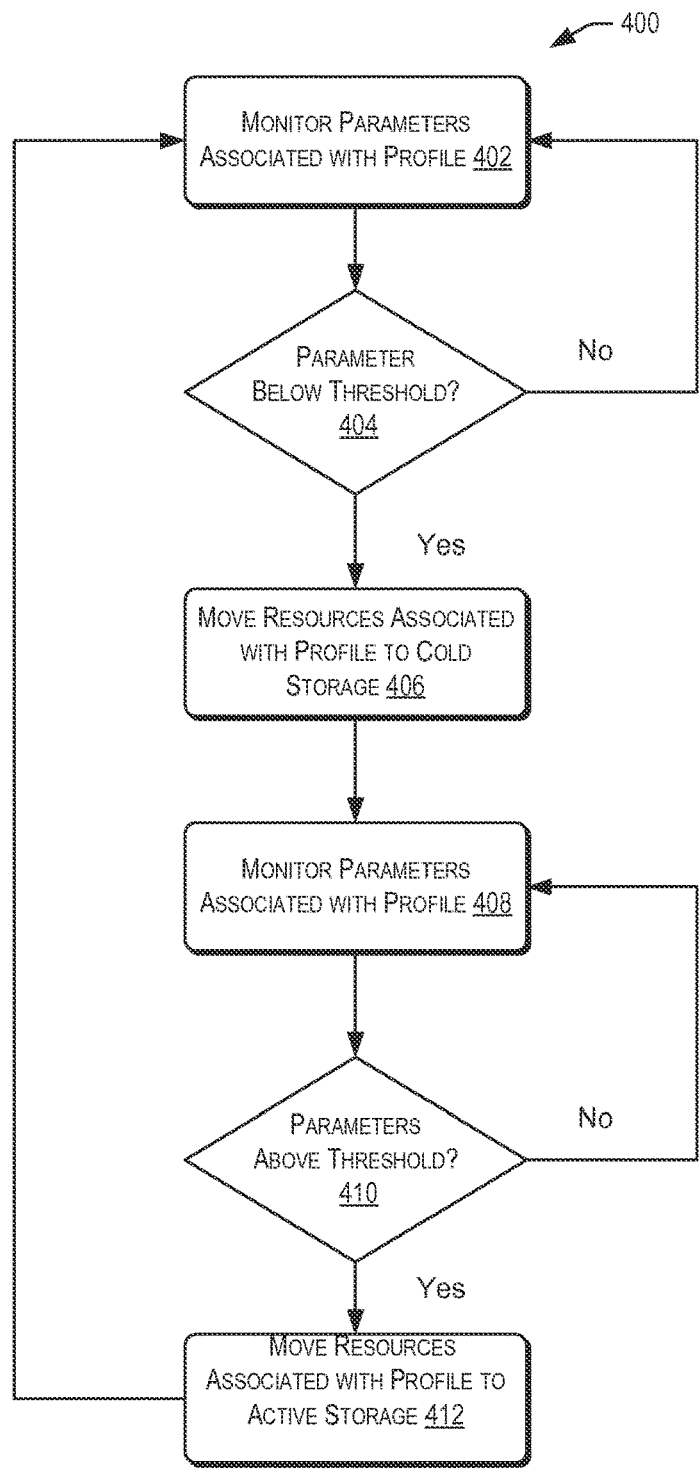
FIG. 4 is a flow diagram depicting an example flow including transitioning a database to and from cold storage as described herein, according to at least one other example.
Figure 5:
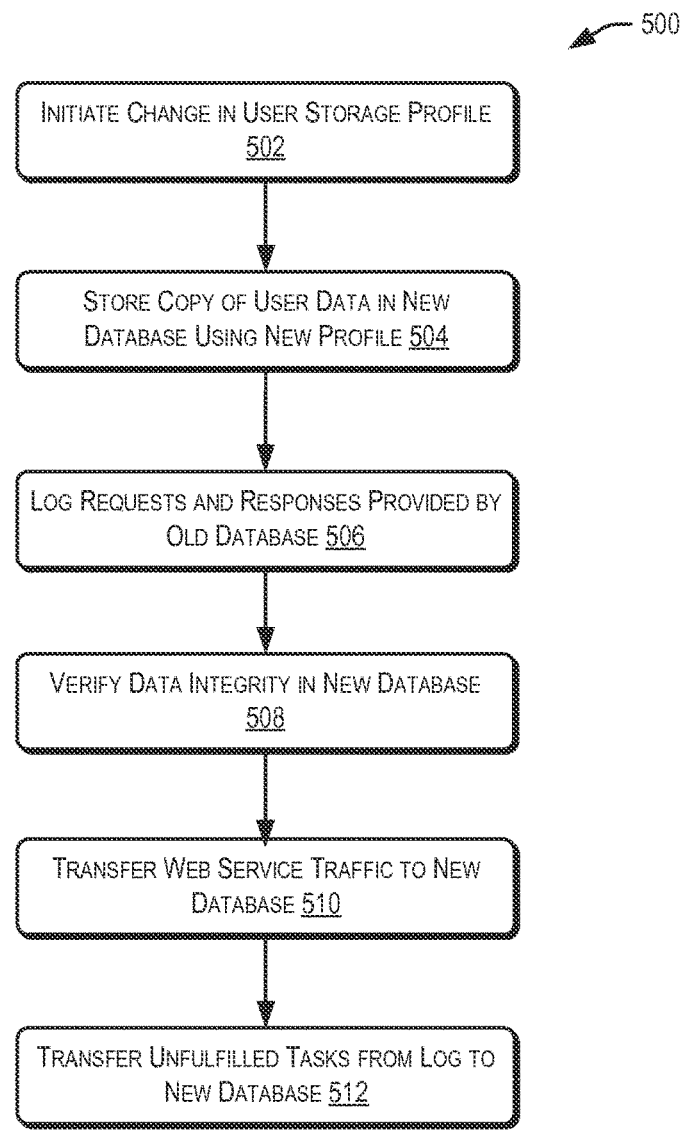
FIG. 5 is a flow diagram depicting an example flow including a customer enrollment for implementing web service support as described herein, according to at least one other example.

FIGS. 3-5 illustrate example flow diagrams showing respective processes 300, 400 and 500 for implementing data store management processes as described herein. These processes are illustrated as logical flow diagrams, each operation of which may represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

Some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 3 depicts an illustrative flow 300 in which techniques for managing a multi-tenant data store may be implemented. In illustrative flow 300, operations may be performed by one or more processors of one or more service provider computers and/or instructions for performing the operations may be stored in one or more memories of the service provider computers. The flow 300 may begin at 301, in which a user is enrolled in a web service. For example, an offer to provide a web service (e.g., cloud storage, a virtual storefront, etc.) to an entity may be made by a service provider, and accepted by the entity. Such offers may be made, for example, via an automated web page that the entity interacts with to purchase web services. Information provided to, or received from, the user may include user preferences for how a website will appear, selection of functionality offered by the service provider, and/or user-provided or solution provider-provided code to be included in the web service.

In some examples, the service provider may provide the option for the entity to purchase, license, or otherwise acquire, all of the code necessary to establish a website, webstore, etc., from the service provider. In this regard, the service provider may act as a reseller of one or more aspects of the web service being purchased.

In some examples, the user may select certain preferences, e.g., storage access, storage duration, search functionality, automated logging, etc., that may further inform the process of enrollment for the user, such as by narrowing available pricing options and the like during the enrollment process. For example, if the tenant prefers to have programmatic access to his data using SQL, this could narrow down the options to storage profiles with (per tenant) dedicated database in the Cloud. These preferences may further be used to identify and/or create the appropriate storage profile assigned to the user, as discussed further below.

The flow 300 may optionally continue with 302, in which user data may be analyzed by the service provider, e.g., to determine storage requirement, an appropriate database and/or support tier, pricing, etc. This may be done, for example, by the user uploading data to be stored, providing descriptive characteristics of the data to be stored, etc.

The flow 300 may continue with 303, in which the service provider may assign a storage profile to the entity/user. The assignment of the storage profile may be based on an actual selection by the user, e.g., from a full or partial range of options provided by the service provider, or based on estimates and/or automated selections made by a service provider computing system. During the enrollment process, the service provider may apply a rule-based approach to automatic assignment of best-fit profiles based on, for example, business characteristics of the entity, whether the entity already has an established storefront (and what metrics may be obtained from that), desired searchability and/or indexing, as well as other analytics related to rates of data change, tenant and/or user access, rates of reading, writing and/or deleting information from the database, etc.

In this regard, the service provider may alternatively offer the user various tiers of web service management and support, based on the foregoing or simply based on predetermined tiers that are offered by the service provider.

In some examples, ideal data characteristics may be expressed as domain specific rules that indicate if a specific storage profile is a best fit for a tenant based on the tenant's data characteristics. For example, for the multi-seller e-commerce platform, such rules may be expressed using variables including, the tenure of seller on the platform, the size of his catalog, rate of change, data retention requirements, order history, and special options provided in association with a particular web service.

In some example, systems may be configured to estimate one or more of the foregoing metrics, as well as other relevant values, in order to suggest or assign appropriate storage profile(s) to the entity.

In some examples, the service provider may provide the customer the option of modifying the selected tier for the web service. This may happen at any time after the customer's initial selection, and may even take place prior to providing the web service. For example, if the analysis conducted in 302 or 312 indicates a more appropriate tier than that selected by the customer, e.g., based on pricing, storage access, etc., the service provider may present the customer with the option to change their selection to the more appropriate tier.

In some examples, the service provider may "push" the customer to change the tier of an existing web service, e.g., by offering pricing, features or other solutions, that will result in a change to the tier of the web service. In some examples, the option may be presented to the customer based on a request from the customer to change the tier of the web service, or in response to a suggested change to some code or other aspect of the web service that would otherwise alter the tier of the web service.

In some examples, one tier may be commonly supported and managed by the service provider on common servers and/or database infrastructure, whereas the web services of another tier may be supported by a subset of servers or infrastructure according to some commonality among one or more of the second tier web services. In some examples, the web services of yet another tier may be isolated from one another, and/or from web services in the other tiers, and supported by their own exclusive servers and/or infrastructure.

In some examples, each storage profile may be uniquely created for each new tenant. However, it may also be possible to grant a new tenant access to an existing profile, e.g., for a shared database, assuming that appropriate security can be maintained between the new tenant and existing tenants.

The flow 300 may continue with 306, in which the service provider configures a database for the newly-enrolled tenant.

Configuring the database may include, for example, using parameters included in the assigned profile to establish an initial data structure, partition an existing storage device, create encryption keys, etc. In general, any step and/or processing that is required prior to storing tenant data in the database may be included in 306.

The flow 300 may continue with 308, in which the web service is provided for the entity. In some examples, this may include providing cloud storage tools, providing a webstore or other website, according to preferences selected by the entity. As mentioned previously, the web service may be fully supported by the service provider, e.g., the service provider provides all code and servers, or code may be provided by the tenant, and/or a solution provider, that accesses the service provider's data store.

Providing the web service may further include configuring resources of the service provider to support the web service according to a selected tier and/or assigned storage profile. For example, a customer selecting a Tier 1 web service as shown in FIG. 2 may require a stand-alone solution including at least one dedicated database, and possibly one or more dedicated servers to provide the web service, whereas a customer selecting a Tier 2 web service as shown in FIG. 2 may have their service associated with resources supporting other services using the shared database 174.

Providing the web service may further include various levels of support from the service provider and may include the service provider assuming one or more roles/tasks that would otherwise be handled by the entity, e.g., customer/merchant. For example, one or more of payment, shipping, restocking, order assembly and/or aggregation, service quotes, and various other services may be provided by the service provider on behalf of the merchant/customer, with or without individual consumers of the web service being aware of the service provider's role. Such support may include, for example, all manner of e-commerce support known in the art and are not described exhaustively herein.

The flow 300 may continue with 312, in which metrics related to the web service being provided to the tenant may be periodically evaluated for changes that might suggest reclassifying the tier for the web service and/or assigning a new storage profile. In this regard, the data characteristics that determine the ideal storage profile for a tenant may be continually evaluated to identify any "migration" opportunities. When a tenant has grown past the current storage profile, a secondary profile that is ideal for the latest data characteristics may be assigned to the tenant.

Some possible metrics that may be monitored as part of 312 include rates of growth (or decreases) regarding storage size, storage access including resource intense searches, storage operations including write, read and/or delete operations for live databases and/or upload and/or download operations from cold storage, etc. These metrics may beneficially predict and/or detect when the storage/support tier for a given web service and/or tenant is no longer optimal, either from the user or service provider perspective, and may be used to determine a new storage profile to apply to the tenant. For example, such analytics may recognize when a seller is not using resources intensely and efficiently, and may suggest changing the storage profile for the seller to a cold storage profile that puts all of the seller's files into a single file that can be unpackaged as necessary during the infrequent requests for the seller's web service. Alternatively, high demand for, excessive searching of, and/or increasing rates of change to, certain data may suggest that the data be migrated up to a dedicated database that will more effectively fulfill the relevant requests without impacting the performance of other databases.

Various processes for classifying, and dynamically adjusting, tiers for tenants and/or web services are contemplated. Depending on the classification assigned to the tenant, support resources (e.g., servers, storage, bandwidth or other communications resources, etc.) may be configured in different ways, such as, for example, sharing resources among one or more of the web services, or isolating the resources for particular web services from those of other web services. In some examples, various electronic storefronts may be provided by a service provider to entities, such as merchants that are customers of the service provider. The service provider may classify each of the electronic storefronts for the entities to a plurality of tiers.

The flow 300 may continue with 314, in which any necessary reassignment of storage profiles to the tenant may be implemented. As with 304 described above, this process may include modifying an existing storage profile that is assigned to the tenant, modifying an existing storage profile to include access/permissions for the tenant, creating a new profile for the tenant, etc.

The flow 300 may continue with 316, in which a copy of the tenant's data may be stored in a new database via the storage abstraction layer using the updated storage profile. This may include, for example, storing the copy using a different format and/or indexing structure, communicating with a different database via a different communication protocol, changing a storage duration or other system or file parameter associated with the database, encrypting or unencrypting the data, combining or un-combining multiple files, moving the data between a dedicated database, a shared database and/or cold storage, etc.

The flow 300 may continue with 318, in which the web service is resumed using the new database and the updated storage profile. Additional details regarding possible steps that may be implemented in storing and implementing a new copy of a database using a new storage profile are discussed further below with reference to FIG. 4.

FIG. 4 depicts an illustrative flow 400 in which techniques for managing a multi-tenant data store may be implemented. In illustrative flow 400, operations may be performed by one or more processors of one or more service provider computers and/or instructions for performing the operations may be stored in one or more memories of the service provider computers.

The flow 400 may begin at 402, in which parameters associated with a profile, a user and/or a live database may be monitored, collected and/or processed. Such parameters may include, for example, a rate of data or other resource access, a rate of change of data stored in a database, or other parameters that suggest advantages in changing the storage profile for a tenant from an active database to a cold storage database.

Some possible parameters that may be monitored/collected as part of 402 include rates of growth (or decreases) regarding storage size, storage access including resource intense searches, storage operations including write, read and/or delete operations for live databases, etc. One or more of such parameters may beneficially predict and/or detect when the storage/support tier for a given web service and/or tenant is no longer optimal, either from the user or service provider perspective, and may be used to determine a new storage profile to apply to the tenant, e.g., transition to a cold, or other archive, storage.

The flow 400 may continue with 404, in which the one or more parameters being monitored/collected in 402 may be analyzed to determine, for example, whether one or more of the parameters has fallen below a first threshold. The first threshold may represent, for example, a rate of data access, a rate of data change, or various other criteria discussed herein.

If the parameter is not below the first threshold, the flow may return to 402, in which the parameters are continually, or intermittently, monitored/collected. If the parameter is below the first threshold, the flow 400 may continue to 406.

In 406, data, or other resources, associated with the user, profile, or database that is being monitored may be moved to cold storage, or otherwise processed in a manner that may reduce the accessibility to the data, while preferably making the storage of such data more resource-efficient. Such methods may include, for example, converting and storing the data into compressed files, and other archival storage techniques.

In some examples, the storage profile for the relevant user may be changed in 406 to a cold storage profile that puts all of the seller's files into a single file that can be unpackaged as necessary. In some examples, 406 may further include reconfiguring support resources (e.g., servers, storage, bandwidth or other communications resources, etc.).

The flow 400 may continue from 406 to 408, in which parameters associated with a profile, a user and/or a cold storage database may be monitored, collected and/or processed. Such parameters may include, for example, a rate of data or other resource access, a rate of change of data stored in the cold storage, or other parameters that suggest advantages in changing the storage profile for the tenant from the cold storage to an active database.

Some possible parameters that may be monitored/collected as part of 408 include rates of growth (or decreases) regarding storage size, storage access including resource intense searches, storage operations including write, read and/or delete operations for archived data, etc. One or more of such parameters may beneficially predict and/or detect when the storage/support tier for a given web service and/or tenant is no longer optimal, either from the user or service provider perspective, and may be used to determine a new storage profile to apply to the tenant, e.g., transition from cold, or other archive, storage to a live database.

The flow 400 may continue with 410, in which the one or more parameters being monitored/collected in 408 may be analyzed to determine, for example, whether one or more of the parameters has risen above a second threshold. The second threshold may represent, for example, a rate of data access, a rate of data change, or various other criteria discussed herein.

If the parameter is not above the second threshold, the flow may return to 408, in which the parameters are continually, or intermittently, monitored/collected. If the parameter is above the second threshold, the flow 400 may continue to 412.

In 412, data, or other resources, associated with the user, profile, or cold storage that is being monitored may be moved from cold storage to a live database, or otherwise processed in a manner that may increase the accessibility to the data, e.g., reducing retrieval time, increasing searchability, etc. Such methods may include, for example, decompressing or otherwise extracting data files and loading the decompressed/extracted data into a live database.

In some examples, the storage profile for the relevant user may be changed in 412 to a storage profile that allocates data to a dedicated database or a shared database, as discussed further herein. In some examples, 412 may further include reconfiguring support resources (e.g., servers, storage, bandwidth or other communications resources, etc.).

The flow 400 may continue with 402, in which the web service, and the parameter monitoring previously discussed, may be resumed using the new profile/live database established in 412. Additional details regarding possible steps that may be implemented in storing and implementing a new copy of a database using a new storage profile are discussed further below with reference to FIG. 5.

In illustrative flow 500, shown in FIG. 5, operations may be performed by one or more processors of one or more service provider computers and/or instructions for performing the operations may be stored in one or more memories of the service provider computers. The flow 500 may begin at 502, in which the change of a storage profile assigned to a user is initiated. This may be a result of, for example, the analytics performed in 312 of FIG. 3, or a user selection to change a storage/support tier.

The flow 500 may continue with 504, in which a copy of user data (which is currently stored in one or more databases according to a current, or "primary", storage profile), is written to a new database using a new, or "secondary", storage profile for the user. In some examples, this is done while the primary storage profile and current database(s) are still active.

While the data is being copied over to the new database according to the secondary profile, the storage abstraction layer may track any changes in the primary profile/current database. For example, the flow 500 may include logging various database requests and responses in 506, that can be used later on to ensure coherence between the primary and secondary profiles, and current and new databases.

This may be used to facilitate "online migration" of data, where the data from the primary profile is copied over to the secondary profile and changes during the migration, and is replayed until they converge to an acceptably small number.

Once the secondary profile closely shadows the primary profile and the validity of the data in the new database has been verified, e.g., in 508, short duration locks may be taken on both the profiles and the secondary is moved to the primary status in 510 where the web service is transferred to the new database.

The flow 500 may continue with 512, in which any unfulfilled tasks from the log in 506 may be acted upon and completed. For example, any pending write, read and/or delete operations that were held during migration and/or switching of the primary and secondary profiles may be executed in the new database. Such instructions may be implemented according to timestamps, logical operations, or other processes known in the art.

This above "online" approach to migrating tenants' data may ensure that the storage solutions scale with the tenant, and the tenant does not experience any appreciable downtime during this process.

Some examples may further include monitoring access patterns for the tenant data, e.g., in 510, such that the traffic migration in 510 can be planned to best suit the tenant schedule and minimize the impact of the short-duration locks.

Processes such as those described above have been found by the inventors to mitigate various challenges and problems that have arisen in multi-tenant data store environments, such as attempting to compensate for each user in the environment being subject to varying rates of growth. In this regard, conventional platforms typically are not able to estimate growth accurately and/or to scale the multi-tenet data store appropriately. As such, spikes in data access, searches, etc., related to a single user can disrupt an entire platform. By incorporating monitoring and predictions such as those discussed herein, systemic issues arising from operating at increased scale can be significantly mitigated and/or avoided, such as problems with one user that may otherwise have a substantial impact on all the users of the platform.

Figure 6:
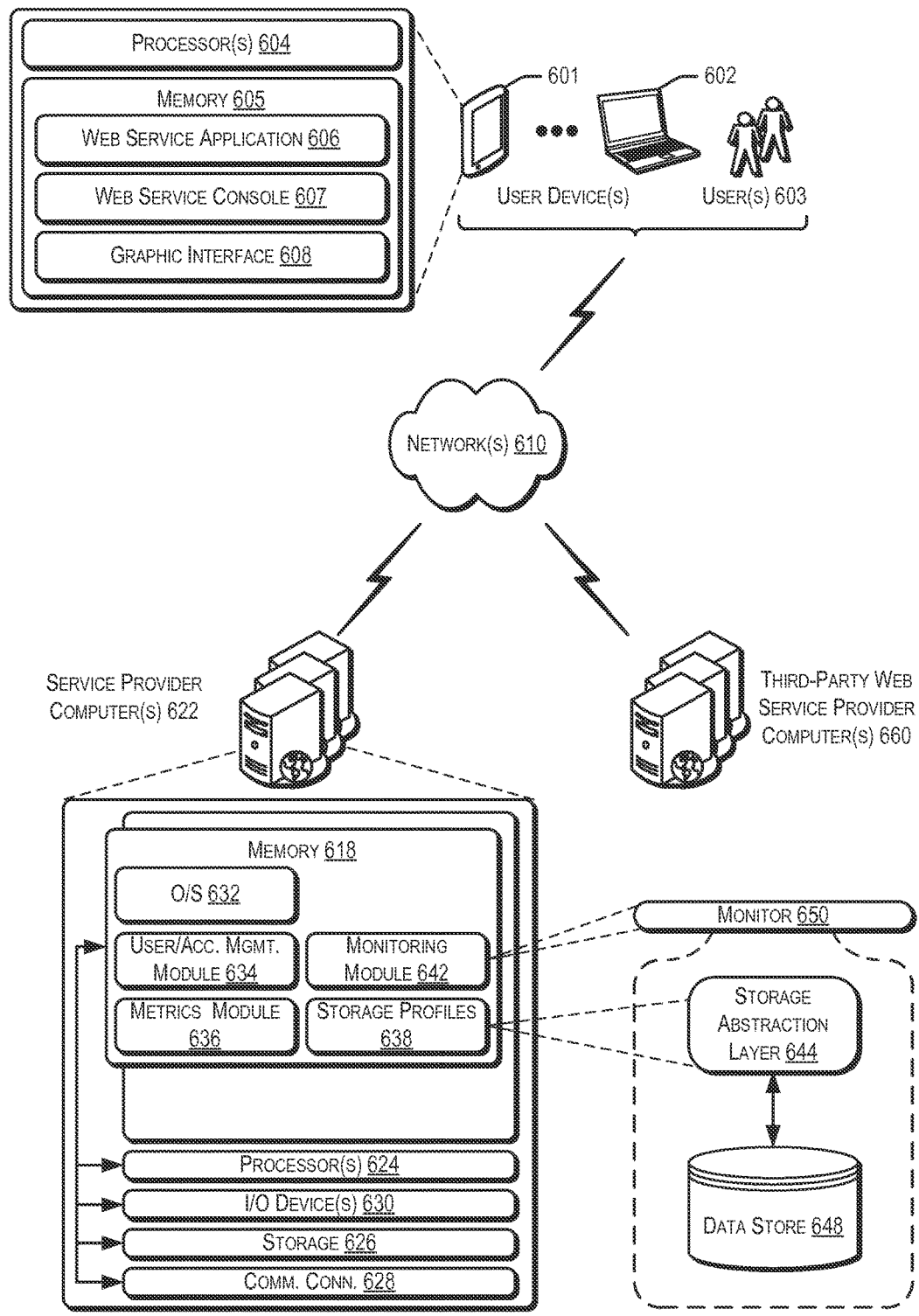
FIG. 6 illustrates an example of a web hosting environment that may be used to access a multi-tenant data store, according to at least one other example.

FIG. 6 depicts an illustrative system or architecture 600 in which techniques for managing a multi-tenant data store may be implemented. In architecture 600, one or more customers and/or users 603 may utilize user computing devices 601-602 (collectively, "user devices") to access a web service application 606, or a user account accessible through the web service application 606, via one or more networks 610. In some aspects, the web service application 606 and/or user account may be hosted, managed, and/or otherwise provided by a computing resources service or service provider, such as by utilizing one or more service provider computers 622. In some examples, a customer may own, manage, operate, control, or otherwise be responsible (e.g., financially) for one or more accounts, groups of accounts, and/or sub-groups of accounts. The one or more service provider computers 622 may, in some examples, provide computing resources such as, but not limited to, web hosting, client entities, data storage, data access, management, virtualization, etc. In some aspects, a processing entity may be virtual and/or data volumes may be stored virtually within a distributed computing system operated by the one or more service provider computers 622. The one or more service provider computers 622 may also be operable to provide e-commerce support, web hosting, computer application development, and/or implementation platforms, combinations of the foregoing, or the like to the one or more users 603.

In some examples, the networks 610 may include any one or a combination of many different types of networks, such as cable networks, the Internet, wireless networks, cellular networks, and other private and/or public networks. While the illustrated example represents the users 603 accessing the web service application 606 over the networks 610, the described techniques may equally apply in instances where the users 603 interact with a service provider computer 622 via the one or more user devices 601, 602 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the web service application 606 may allow the users 603 to interact with a service provider computer 622, such as to store, access, and/or manage data, develop and/or deploy computer applications, and/or host web content. In one example, the service provider computer 622 may support a multi-tenant data store 648 that is accessible by a plurality of users 603 having assigned storage profiles 638, such as described herein.

The one or more service provider computers 622, perhaps arranged in a cluster of servers or as a server farm, may host the web service application 606. Other server architectures may also be used to host the web service application 606. The web service application 606 may be capable of handling requests from many users 603 and serving, in response, various user interfaces that can be rendered at the user devices 601, 602 such as, but not limited to the resource management console 607 and/or the graphic interface 608. The web service application 606 can be any type of website that supports user interaction, including social networking sites, online retailers, informational sites, blog sites, search engine sites, news and entertainment sites, and so forth. As discussed above, the described techniques can similarly be implemented outside of the web service application 606, such as with other applications running on the user devices 601, 602. In some examples, the web service application may access the multi-tenant data store 648, e.g., to write, read and/or delete data.

As noted above, the architecture 600 may include one or more user devices 601, 602. The user devices 601, 602 may be any type of computing device such as, but not limited to, a mobile phone, a smart phone, a personal digital assistant (PDA), a laptop computer, a desktop computer, a thin-client device, a tablet PC, etc. In some examples, the user devices 601, 602 may be in communication with the service provider computers 622 via the networks 610, or via other network connections.

In one illustrative configuration, the user devices 601, 602 may include at least one memory 605 and one or more processing units (or processor(s)) 604. The processor(s) 604 may be implemented as appropriate in hardware, computer-executable instructions, firmware, or combinations thereof. Computer-executable instruction or firmware implementations of the processor(s) 604 may include computer-executable or machine-executable instructions written in any suitable programming language to perform the various functions described.

The memory 605 may store program instructions that are loadable and executable on the processor(s) 604, as well as data generated during the execution of these programs. Depending on the configuration and type of user device 601, 602, the memory 605 may be volatile (such as random access memory (RAM)) and/or non-volatile (such as read-only memory (ROM), flash memory, etc.). The user device 601, 602 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 605 may include multiple different types of memory, such as static random access memory (SRAM), dynamic random access memory (DRAM), or ROM.

Turning to the contents of the memory 605 in more detail, the memory 605 may include an operating system and one or more application programs or services for implementing the features disclosed herein including at least the web service console 607 or the graphic interface 608, such as web browsers or dedicated applications (e.g., smart phone applications, tablet applications, etc.), and/or the web service application 606. The web service console 607 may be configured to receive, store, and/or display a website or other interface for interacting with the service provider computers 622. All, part, or none of the graphic interface 608 may be viewable and/or integrated within the web service console 607. Additionally, the memory 605 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 601.

Additionally, in some aspects, the web service console 607 may allow a user to interact with a web services account of the service provider computers 622. For example, the user 603 may request that computing resources be allocated to instantiate a processing entity on behalf of the user 603. Further, the client instance may then be physically or virtually attached to one or more data stores via interaction between the user 603 and the web service console 607. The web service console 607 may also be configured to receive, organize, store, and/or manage storage profiles for users as described herein, account settings and/or other preferences. For example, configuration settings associated with how many instances to utilize, what network ports to open, whether to purchase reserved instances, locations and/or zones in which data should be stored, user-preferred security settings, etc., may be received from, stored on behalf of, and/or managed on behalf of the user and/or account via the web service console 607.

In some examples, the service provider computers 622 may also be any type of computing devices such as, but not limited to, mobile, desktop, thin-client, and/or cloud computing devices, such as servers. In some examples, the service provider computers 622 may be in communication with the user devices 601, 602 and/or the third-party service provider computers 660 via the networks 610, or via other network connections. The service provider computers 622 may include one or more servers, perhaps arranged in a cluster, as a server farm, or as individual servers not associated with one another. These servers may be configured to host a website (or combination of websites) viewable via the user devices 601, 602 or a web browser accessible by a user 603.

In one illustrative configuration, the service provider computers 622 may include at least one memory 618, and one or more processing units (or processor(s)) 624. The processor(s) 624 may be implemented as appropriate in hardware, computer-executable instructions, firmware, or combinations thereof. Computer-executable instruction or firmware implementations of the processor(s) 624 may include computer-executable or machine-executable instructions written in any suitable programming language to perform the various functions described.

The memory 618 may store program instructions that are loadable and executable on the processor(s) 624, as well as data generated during the execution of these programs. Depending on the configuration and type of service provider computers 622, the memory 618 may be volatile (such as random access memory (RAM)) and/or non-volatile (such as read-only memory (ROM), flash memory, etc.). The service provider computers 622 or servers may also include additional storage 626, which may include removable storage and/or non-removable storage. The additional storage 626 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 618 may include multiple different types of memory, such as static random access memory (SRAM), dynamic random access memory (DRAM), or ROM.

The memory 618, the additional storage 626, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 618 and the additional storage 626 are all examples of computer storage media. Additionally, the memory 618, and other envisioned memory devices of the service provider computers 622 are intended to cover systems where the different memory devices may be distributed among multiple host computing systems. Additionally, other memory devices may be implemented by other different host devices. Further, one or more different modules and/or sets of modules may be implemented by different hosts, in some examples, even located in different locations and/or on different racks. For example, one or more application programs or services implemented by the service provider computers 622 may each be implemented by different host computing devices, or the like.

The service provider computers 622 may also contain communications connection(s) 628 that allow the service provider computers 622 to communicate with a stored database, another computing device or server, user terminals, and/or other devices on the networks 610. The service provider computers 622 may also include input/output (I/O) device(s) 630, such as a keyboard, a mouse, a pen, a voice input device, a touch input device, a display, speakers, a printer, etc.

Turning to the contents of the memory 618 in more detail, the memory 618 may include an operating system 632 and the one or more application programs or services for implementing the features disclosed herein including a user application/account management module 634, a plurality of storage profiles 638, and/or a monitoring module 242. The user application/account management module 634 may be configured to generate, host, or otherwise provide the web service console 607, and/or a website for accessing the web service console 607, to users 603. In some examples, the user application/account management module 634 may also be configured to maintain, or otherwise store, storage profiles, account information associated with requested resources, data, and/or services. The account information may include account holder information, the user ID, the password, acceptable answers to challenge questions, etc.

Additionally, as noted above, each of the aforementioned modules 632, 634, 636, 638, 642, and 646 may be implemented or otherwise provided by different host computing devices of the service provider computers 622. For example, while the metrics module 636 and the storage profiles 638 are illustrated in FIG. 5 as being stored within the memory 618 and, potentially hosted by a single computing device, it will be understood that these modules (and/or any of the other modules in the memory 618) may be stored or implemented by one or more different hosts devices of the service provider computers 622 (e.g., in a distributed environment).

In some aspects, the storage profile module 638 may be configured to operate in coordination with a storage abstraction layer 644 associated with data store 648.

Data store 648 may be included with service provider computer 622 or any other computing system in communication with service provider computer 622. The storage profile module 638 may be configured to create, generate, instantiate, or otherwise provide one or more machine instances to communicate with storage abstraction layer 644. Such machine instances of the storage profiles 638 may be considered as a processing entity acting on behalf of a user 603 that the storage profile is assigned to, and may, for example, access data, data sets, data volumes, data blocks, etc., of the data store 648.

Other operations and/or configurations utilizing a machine instance of storage profiles 638 and/or the data store 648 may be envisioned, as desired, for implementing a web service on behalf of a user 603.

Returning to the contents of the memory 618 in more detail, the service provider computers 622 may execute a user application/account management module 634. In some examples, the user application/account management module 634 may be configured to generate, assign, or otherwise provide storage profiles 638 for particular users 603. In some aspects, the service provider computers 6220 may also execute a monitoring module 642 which may be configured to host or otherwise provide a monitor 650 for monitoring, collecting, or otherwise receiving, performance information associated with one or more resources associated with the data store 648 and/or storage abstraction layer 644. The monitor 650 may be configured to acquire any of the various metrics described herein related to assessing the performance of a given database and/or the suitability of a particular storage profile for a given user.

Further, the monitor 650 may also be configured to aggregate performance information associated with one or more related or unrelated accounts. In one non-limiting instance, the monitor 650 may receive API calls placed by the storage abstraction layer 644 or may scrape the data store 648 for data usage information, database size, etc.

In other examples, the monitor 650 may receive API calls placed by other entities on other resources and/or may determine configuration information associated with the resources by querying one or more configuration files of the service provider computers 622 that are associated with the one or more users 603 and/or accounts of users 603. Additionally, the monitor 650 may be configured to receive or otherwise collect performance information for computing resources other than the storage abstraction layer 644 and data store 648. For example, the monitor 650 may receive performance information associated with a web site or other computing resource including, but not limited to, services and/or resources provided by the third-party service provider computers 660. For example, while the monitor may not be able to actively monitor resources of a third-party computing system, the monitor 650 may be configured to receive performance information from such third-party systems.

The metrics module 236 may, in some examples, be configured to calculate any number of metrics based on collected data described herein, e.g., changes in storage access, traffic, capacity, percentiles for the monitored, received, and/or stored performance metrics associated with the monitored computing resources and/or services. Additionally, in some examples, the metrics module 236 may calculate other statistically relevant information associated with the collected data including, but not limited to, an average, a mean, a maximum, a minimum, a "top N," and/or a "bottom N." Top N may refer to a calculation of a top number of values for a data set, while Bottom N may refer to a bottom number of values of a data set. For example, "top 1" may indicate a calculation of the largest number in a data set, which may also correspond to the maximum, while "top 2" may indicate a calculation of the two largest numbers in the data set.

The third-party web service provider computers 660 may be any type of computing system as well. In some examples, the third-party web service provider computers 660 provide web services and/or other computing resources to users 603 that are similar to the services and/or resources that may be provided by the service provider computers 622. For example, the third-party computers 660 may be configured as web servers, cloud storage devices, or the like. In some examples, the user application/account management module 634, described above, may also be configured to provide general and/or specific performance metrics to users 603. For example, a user 603 that subscribes or other utilizes the service provider computers 622 to implement one or more web services may be automatically registered to receive performance metrics (e.g., percentiles, top N data, graphs, charts, etc.) associated with such services from the user application/account management module 634. Additionally, a user 603 may register an account, service, and/or resource provided by the third-party web service provider computers 660 with the user application/account management module 634. In this way, the user application/account management module 634 may provide similar metrics (e.g., percentile charts, etc.) associated with the third-party computers 660 to the users.

Additional types of computer storage media that may be present in the service provider computers 622 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 622. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 7:
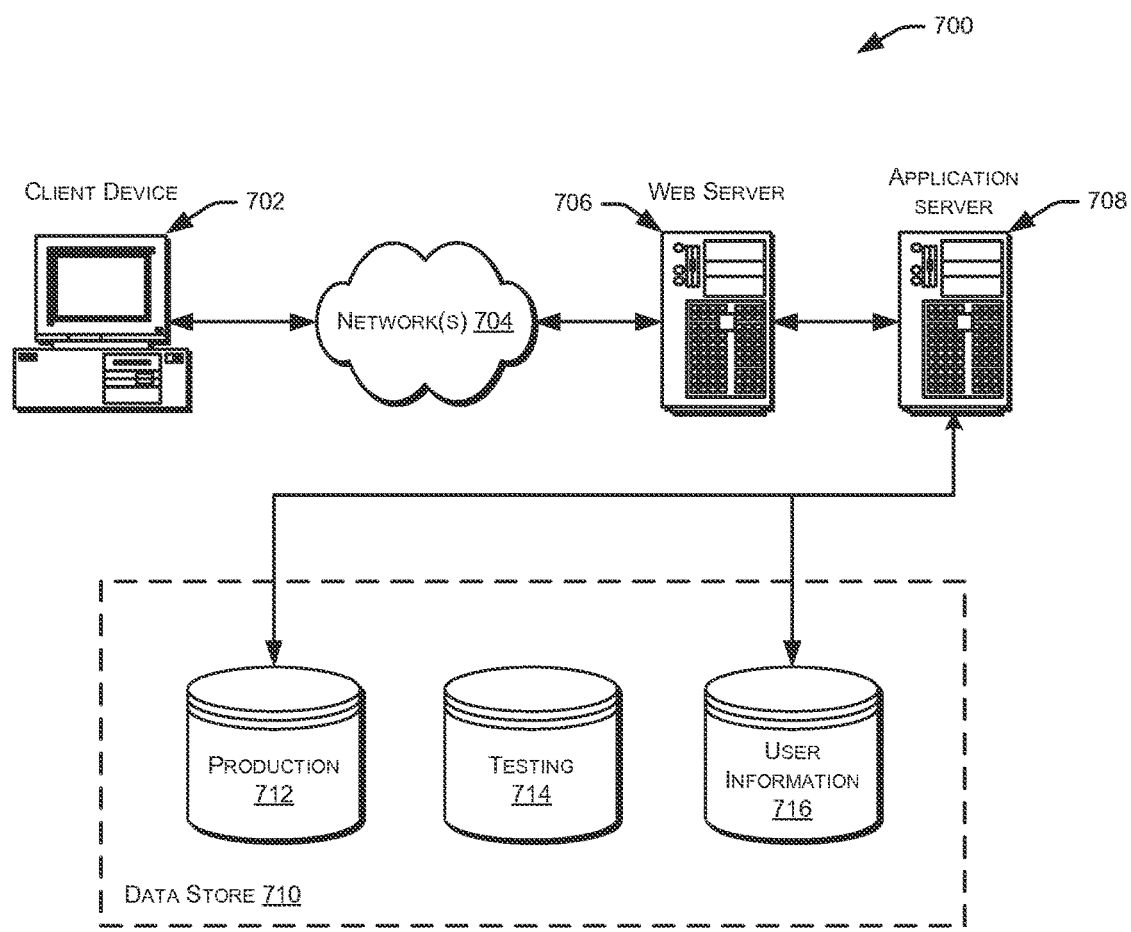
FIG. 7 illustrates an example architecture for implementing web service support as described herein, according to at least one other example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other purposes such as those described herein. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   providing, by a computer system, a data store including a plurality of databases, the data store supported by a service provider;
   providing web services for a plurality of tenants of the service provider, each of the web services accessing at least one of the plurality of databases of the data store;
   determining, for a first tenant, a first storage profile from a plurality of storage profiles, the first storage profile being determined based at least in part on characteristics of data of the first tenant, the first storage profile including parameters for specifying a type of database to be provided for the first tenant, the type of database being one of a dedicated database type, a shared database type, or a cold storage type;
   storing the data associated with the first tenant according to the parameters of the first storage profile, the data being stored in a first database of the plurality of databases utilizing a storage abstraction layer that is configured to access the plurality of databases and to implement the parameters included in at least the first storage profile that specify the type of database to be provided to the first tenant;
   monitoring, by the computer system, usage by the first tenant of the first database;
   reassigning, by the computer system, the first tenant to a second storage profile that is different from the first storage profile based at least in part on the monitoring, the second storage profile comprising different parameters for specifying the type of database to be provided by a second database of the plurality of databases; and
   migrating, by the computer system, the data associated with the first tenant from the first database to the second database, wherein subsequent storage of the data associated with the first tenant at the second database is in accordance with the second storage profile.

2. The computer-implemented method of claim 1, wherein the first storage profile includes parameters assigning a web service provided for the first tenant to a dedicated database of the plurality of databases, and at least one other profile assigned to another tenant includes parameters for assigning the web services provided for the another tenant to a shared database of the plurality of databases.

3. The computer-implemented method of claim 1, wherein the first storage profile includes parameters assigning a web service provided for the first tenant to a shared database, and at least one other profile assigned to another tenant includes parameters for assigning the web service provided for the another tenant to a cold storage database of the plurality of databases.

4. The computer-implemented method of claim 1, wherein a shared database of the plurality of databases includes at least one physical database that is partitioned to different tenants.

5. The computer-implemented method of claim 1, wherein reassigning the first tenant to the second storage profile includes storing a copy of database content for the web services provided for the first tenant using the second storage profile.

6. A system, comprising:
   a memory that stores computer-executable instructions; and
   a processor configured to access the memory and execute the computer-executable instructions to collectively at least:
   provide a data store including a plurality of databases, the data store supported by a service provider;
   provide web services for a plurality of tenants of the service provider, each of the web services accessing at least one of the plurality of databases of the data store;
   assign a first tenant of the plurality of tenants a first storage profile comprising parameters specifying a database type to be provided, the database type being one of a dedicated database type, a shared database type, or a cold storage type, the first storage profile identifying physical storage parameters for at least a first database of the database type from among the plurality of databases, the first database accessible by at least a first web service from among the web services, the first web service provided for the first tenant;
   provide a storage abstraction layer that is configured to access the plurality of databases of the data store and to implement the parameters included in the first storage profile assigned to the first tenant, wherein providing the first web service for the first tenant comprises the storage abstraction layer using the parameters included in the first storage profile assigned to the first tenant to at least one of read, write, or delete data stored in the first database; and migrate the data associated with the first tenant from the first database to a second database corresponding to a second storage profile based at least in part on a monitored usage associated with the first tenant and the first database.

7. The system of claim 6, wherein the parameters of the first storage profile further comprise a mode of data access for the first database.

8. The system of claim 7, wherein the storage abstraction layer is configured to access databases having different parameters using different data access modes included in different storage profiles.

9. The system of claim 6, wherein the first storage profile specifies a dedicated database type with a specified storage scheme, and at least one other storage profile specifies a shared database type with a different specified storage scheme.

10. The system of claim 6, wherein the first storage profile is assigned to the first tenant based at least in part on at least one of a length of time that the first tenant has been hosted by the service provider, a required database size for the first web service, a rate of change for the first database, a data retention requirement associated with the first web service, or web service options requested by the first tenant.

11. The system of claim 10, wherein the processor is further configured to estimate at least one of a required database size for the first web service, a rate of change for the first database, or a data retention requirement associated with the first web service.

12. The system of claim 6, wherein the processor is further configured to reassign the first tenant to a second storage profile that differs from the first storage profile based at least in part on the monitored usage, the monitored usage indicating at least one of the first tenant's use of resources of the service provider, the first tenant's access to the first web service, users' access to the first web service, or changes in a size of the first database.

13. The system of claim 12, wherein reassigning the first tenant to the second storage profile includes storing a copy of database content from the first database using the second storage profile.

14. The system of claim 6, wherein the first storage profile is dedicated to the first tenant and at least one other storage profile is assigned to multiple other tenants.

15. The system of claim 6, wherein a web service includes at least one of cloud storage, an electronic storefront, a financial service, human resources management, or web-based publishing.

16. A system, comprising:
a memory that stores computer-executable instructions;
a plurality of data storage devices; and
a processor configured to access the memory and execute the computer-executable instructions to collectively at least:
provide a data store including a plurality of databases stored on the data storage devices;
provide a web service with access to the plurality of databases;
enroll a user with the web service by providing the user with a plurality of options related to at least one of database size, resource access, or physical storage parameters for at least one database;
in response to enrolling the user, assign the user to a first storage profile specifying parameters for identifying a database type to be provided and for defining resource access to at least one database of the database type from among the plurality of databases, the database type being one of a dedicated database type, a shared database type, or a cold storage type;
provide a storage abstraction layer that is configured to access the plurality of databases and to store data associated with the user at a first database of the database type utilizing the parameters included in the first storage profile;
monitor usage of the plurality of databases, the usage being associated with at least one of the user's use of resources, the user's access to the web services provided, another user's access to the web services provided for the user, or a change in a database size of one of the plurality of databases that is accessible by the user;
reassign the user to a second storage profile that is different from the first storage profile based at least in part on the monitored usage; and
migrate stored data associated with the user from the first database to a second database based at least in part on the monitored usage, the second database corresponding to the second storage profile.

17. The system of claim 16, wherein assigning the first storage profile to the user includes at least one of creating the first storage profile or selecting the first storage profile from a plurality of existing storage profiles, based on a user response to the plurality of options, and wherein the first storage profile assigned to the user defines physical storage parameters and a mode of data access for the first database.

18. The system of claim 16, wherein the computer-executable instructions further comprise instructions for enrolling a plurality of users with the web service, at least two of the users being assigned different storage profiles including different physical storage parameters and modes of data access, and the storage abstraction layer configured to implement the different physical storage parameters and modes of data access included in the different storage profiles.

19. The system of claim 16, wherein storage profiles available to be assigned to the user include at least one storage profile that provides a dedicated database with a specified storage scheme for the user, and at least one storage profile that accesses a shared database with a specified storage scheme for multiple users.

20. A computer-readable storage medium storing computer-executable instructions that, when executed by one or more computer systems, configure the one or more computer systems to perform operations comprising:
providing a plurality of web services for a plurality of entities, the plurality of web services accessing a plurality of databases, at least a first web service from among the plurality of web services being provided for a first entity from among the plurality of entities, and the first web service accessing at least a first database from among the plurality of databases;
assigning the first web service to a tier from among a plurality of tiers, the plurality of tiers comprising:
a first tier comprising one or more dedicated databases of the plurality of databases;
a second tier comprising one or more shared databases of the plurality of databases, an individual shared database being utilized by at least two of the plurality of entities; and
a third tier comprising one or more cold storage databases of the plurality of databases;

assigning a first storage profile to the first entity for the first web service based at least in part on the tier to which the first web service is assigned, the first storage profile including parameters for specifying a database type to be provided, the database type being one of a dedicated database type, a shared database type, or a cold storage type;

providing a storage abstraction layer that is configured to access the plurality of databases and to implement the parameters included in the first storage profile;

monitoring usage of the plurality of databases, the usage being associated with at least one of the first entity's use of resources, the first entity's access to the web services provided for the first entity, another entity's access to the web services provided for the first entity, or a change in a database size of one of the plurality of databases that is accessible by the first entity; and migrating data associated with the first entity from the first database to a second database corresponding to a second storage profile based at least in part on the monitored usage.

21. The computer-readable storage medium of claim 20, further comprising reassigning the first web service from at least one of the first tier or the second tier to the third tier based at least in part on a parameter related to access of the first database falling below a first threshold.

22. The computer-readable storage medium of claim 21, further comprising reassigning the first web service from the third tier to at least one of the first tier or the second tier based at least in part on a parameter related to access of the first database rising above a second threshold.

23. The computer-readable storage medium of claim 20, further comprising reassigning the first web service from the tier to a different tier, and changing the storage profile assigned to the first entity, based at least in part on metrics associated with at least one of storage requirements of the first entity, database operations of the first database, or resource usage related to the first web service.

24. The computer-readable storage medium of claim 23, wherein reassigning the first web service from the tier to a different tier, and changing the storage profile assigned to the first entity, includes storing a copy of database content for the first web service using a different storage profile than the first storage profile originally assigned to the first entity.

* * * * *